United States Patent [19]

Gaignet

[11] Patent Number: 4,944,875

[45] Date of Patent: Jul. 31, 1990

[54] PLURAL FILTER TUBE SEQUENTIAL DISTRIBUTION APPARATUS

[75] Inventor: Yves Gaignet, Montigny Le Bretonneux, France

[73] Assignee: Millipore, S.A., St. Quentin en Yvelines Cedex, France

[21] Appl. No.: 208,924

[22] Filed: Jun. 20, 1988

[30] Foreign Application Priority Data

Jun. 18, 1987 [FR] France .................................. 87 08509

[51] Int. Cl.⁵ ............................................. B01D 29/24
[52] U.S. Cl. ..................... 210/232; 210/253; 210/264; 210/287; 210/330; 210/335; 210/340; 210/419; 210/456; 55/344
[58] Field of Search .................. 55/342, 343, 344, 350; 210/241, 253, 264, 287, 340, 456, 330, 335, 419, 420

[56] References Cited

U.S. PATENT DOCUMENTS

| | | | |
|---|---|---|---|
| 844,438 | 2/1907 | Bayley | 210/341 |
| 4,191,648 | 3/1980 | Kaplan et al. | 210/340 |
| 4,522,717 | 6/1985 | Brust | 210/340 |
| 4,615,800 | 10/1986 | Stifelman et al. | 210/340 |
| 4,659,460 | 4/1987 | Muller et al. | 210/241 |
| 4,826,594 | 5/1989 | Sedman | 210/287 |

Primary Examiner—Richard V. Fisher
Assistant Examiner—Wanda L. Millard
Attorney, Agent, or Firm—Andrew T. Karnakis; Paul J. Cook

[57] ABSTRACT

A device for the production of ultrapure water comprising tubes containing water treatment elements joined by two end plates. Grids are disposed between the tubes and the end plates to retain resin or carbon particles. Connector terminations provide a hydraulic connection between a control unit and the tubes. The filter is mounted in the tubes by means of an adapter which also provides a seal between inlet and outlet sides of the filter. Holes are provided in the connector terminations and the end plates to enable selection of the path of fluid in the water treatment elements.

7 Claims, 3 Drawing Sheets

PLURAL FILTER TUBE SEQUENTIAL DISTRIBUTION APPARATUS

BACKGROUND OF THE INVENTION

The present invention relates to an apparatus and a process of assembly in the form of a thermally fused or glued one-piece cartridge for the production of ultrapure water.

Ultrapure water, with resistivity greater than 18 megohms-cm and with a total organic compound (TOC) level less than 20 parts per billion, is obtained from slightly ionized water by four or five successive treatments comprising filtration, contact with activated charcoal, contact with mixed anionic and cationic resins, optionally contact with a mixture of resins and activated charcoal, and, lastly a microfiltration step.

The water treatment elements utilized to conduct these treatment steps are traditionally assembled separately in the form of cartridges (very low pressure tubes with tips) incorporated within casings which are often difficult to disassemble, despite the mandatory frequent changing of the cartridges. Moreover, the internal volume, excluding the treatment elements, e.g., the volume between the cartridge and the casing is large, and a relatively long recirculation time is required before water of the desired quality is obtained.

SUMMARY OF THE INVENTION

This invention comprises a tube assembly capable of withstanding the working pressure and which contains the various elements used to treat water as well as two end plates of identical shape for retaining the tubes. The assembly is formed by heat-welding or adhesive bonding depending on the nature of the plastics materials used. The resin or carbon particles are retained within the tubes by a thin grid disposed between the tube and the end plate. A filter is fixed into the tube by means of an adapter which guides it and provides a seal between the inlet and outlet sides of the filter. By including holes in the partitions separating the recesses provided in the end plates for the tubes and connectors it is possible to select how the fluid flows in the tubes according to the water treatment element or their connection in series or in parallel. The cartridge obtained in this way is connected to a control unit containing a pump, valves and monitor and measurement circuits by means of four connectors, two serving as guides and the other two, provided with holes and fitted with O-ring seals, providing the hydraulic connections between the cartridge and the control unit. The cartridge is fit to the control unit by means of a quick-release fastener system cl

BRIEF DESCRIPTION OF THE DRAWINGS

The appended drawings show the invention in the case of a unit with four tubes.

Figure 2:
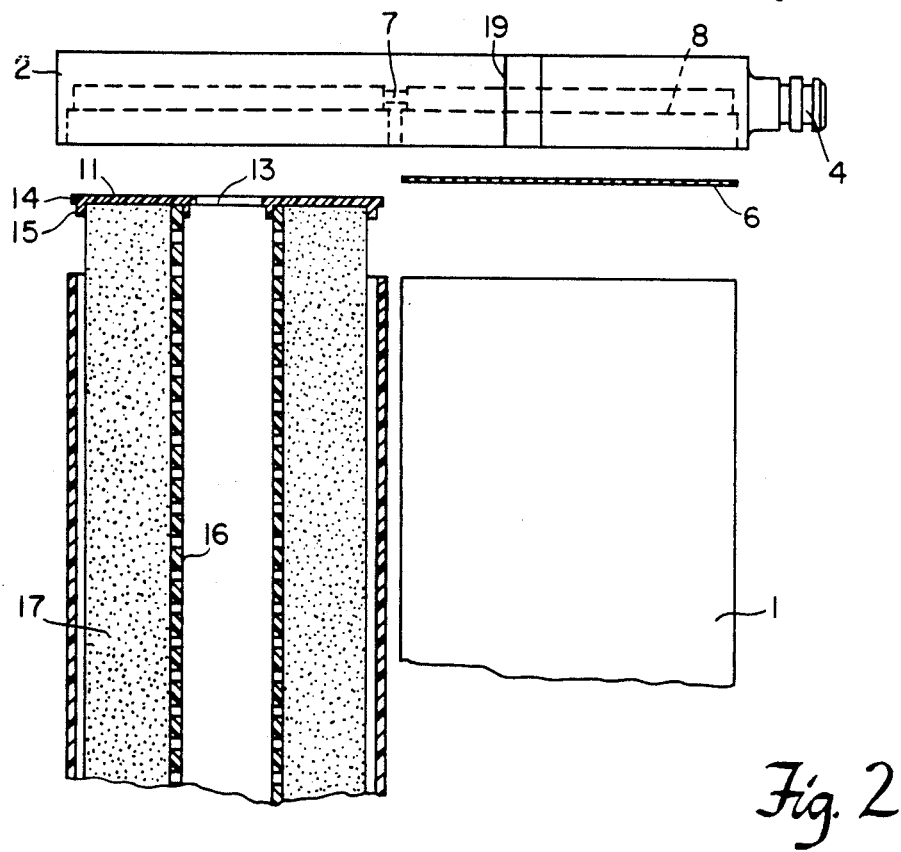
FIG. 2 shows the various component parts of the cartridge in accordance with the invention.
Figure 2:
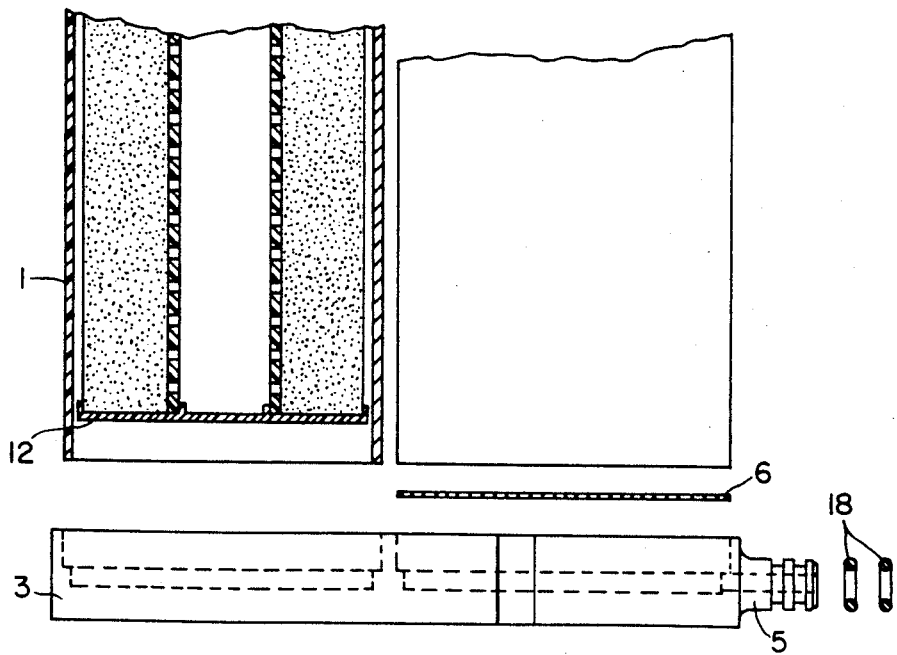

The cartridge shown in FIG. 2 comprises the following components:

TUBES (1): Four tubes the length and diameter of which correspond to the required capacity and flowrate are cut into lengths. Their wall thickness depends on the required working pressure.

Figure 1:
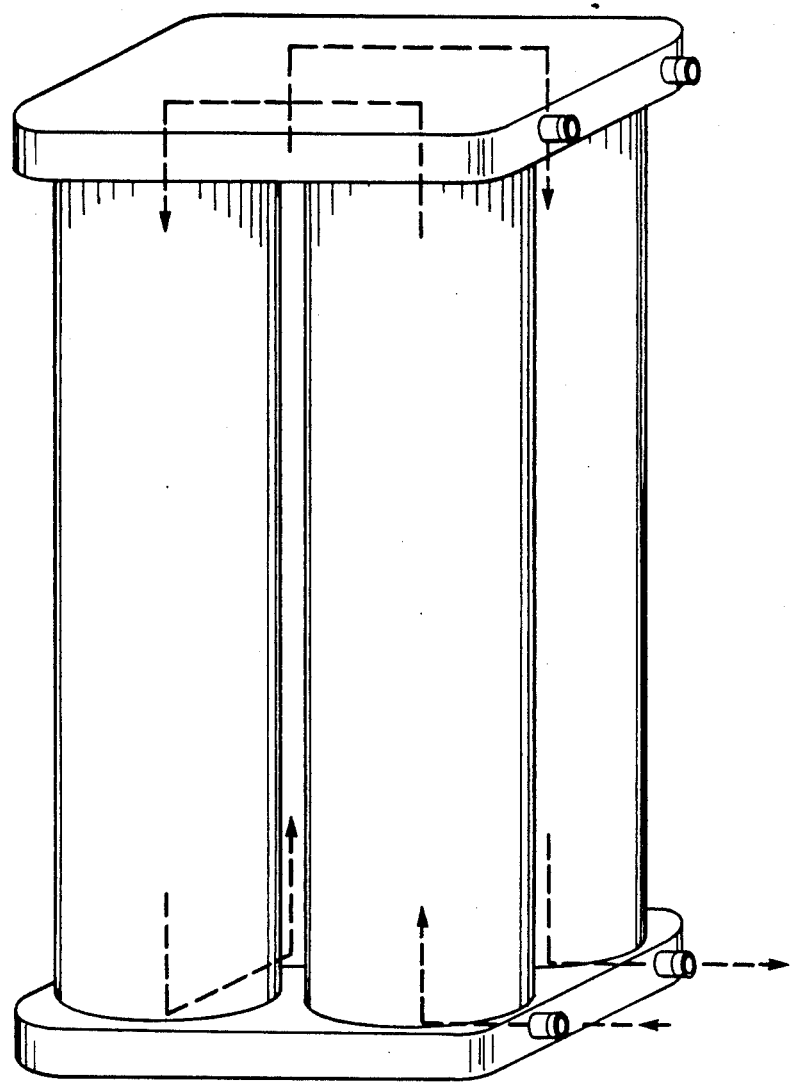
FIG. 1 shows one example of fluid passing into the cartridge.
Figure 3:
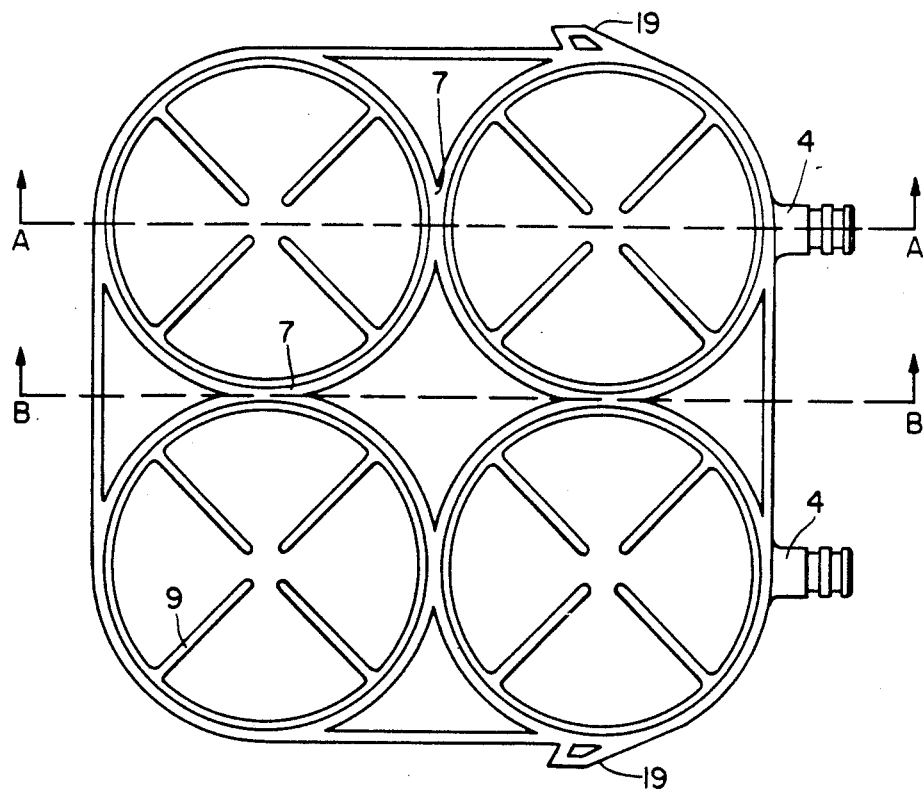
FIG. 3 shows the end plate as seen from the tube side.
Figure 4:
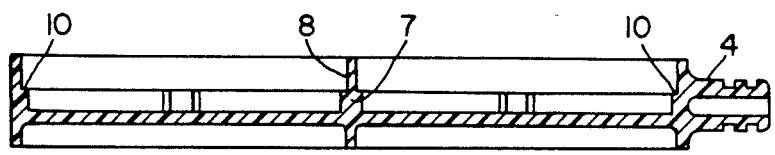
FIG. 4 shows a cross-section along line AA.
Figure 5:
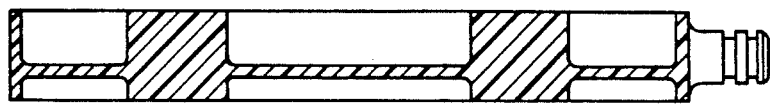
FIG. 5 shows a cross-section along line BB.

END PLATES (2-3): Two molded end plates are used to assemble the four tubes 1. The connectors 5 which are provided with holes and fitted with O-ring seals 18 provide an inlet for water to be treated and an outlet for treated water towards the control unit. The other two connectors 4, which are not provided with holes, are used as guides during fitting of the cartridge to the control unit. The provision of appropriate holes in partitions 7 separating the recesses 8 provided for mounting the tubes 1 makes it possible for the fluid to flow in the tubes (see FIG. 1, for example), with the tubes arranged in series or in parallel, according to the required application. The lip 10 and the star-shaped part 9 support a thin grid 6 in which the pores have a diameter of a few tens of microns. This grid is used only for the recesses corresponding to the tubes filled with resin or carbon particles. A lateral notch or projection 19 is provided on the end plates, as shown in FIG. 3, for securing the cartridge to the control unit by means of snap fastener locking means or any other quick-release fastening system.

ADAPTER 11 FOR THE FILTER (11+12+16+17): The fluid from the lower end plate 3 passes from the outside to the inside of the filter element 17. It is collected in the grid-tube 16 which supports the filter element 17 and is then taken off through the adapter 11 towards the upper end plate 2 and the next treatment element. A plug 12 adhesive-bonded or heat welded to the filter element 17 and the grid tube 16 closes off the lower end of the filter. Its diameter is less than the inside diameter of the tube 1 to enable the fluid to flow along the filter element. The adapter 11 has a similar shape. A hole 13 at the center serves to collect the filtered fluid. A flange 14, the diameter of which is slightly less than the outside diameter of the tube 2, with a rim 15 the outside diameter of which is slightly less than the inside diameter of the tube 1 are used to guide and mount the filter (11+12+16+17) in the tube 1.

ASSEMBLING THE UNITARY CONSTRUCTION CARTRIDGE:

The end plates 2 and 3 are first provided with holes as appropriate to the required result (see above). The grids 6 are adhesive-bonded or heat-welded into the reserved recesses 8. The four tubes 1 are held vertically. The lower end plate 3 is offered up to the tubes from above. The four tubes are then simultaneously adhesive-bonded or welded to the end plate 3. The assembly is turned over. The tubes 1 are respectively filled with resin and carbon particles. The filter (11+12+16+17) is inserted into the corresponding tube. The top end plate 2 is offered up and adhesive-bonded or welded to the tubes. The adapter 11 for the filter (11+12+16+17) is fixed simultaneously to the tube 1 and to the end plate 2 or 3 during this operation. The O-ring seals 18 are mounted on the connectors 5. The fluid-tightness of the completed cartridge is tested using compressed air.

In this way there is obtained in accordance with the invention a disposable unitary construction cartridge which can be used in particular for pre-treatment of water feeding apparatus for purifying water by reverse osmosis or demineralisation.

In this case the successive treatments supplied to the water are:

reduction of the limescale effect by passing the water over a solid polyphosphate type bed, separating out certain colloids and organic substances by passing the water over an anti-colloid resin bed, separating out chlorine and absorbing certain organic substances by passing the water over an activated carbon bed, separating out particles by passing the water through a microporous filter.

All or some of these water pre-treatment elements may be used according to the nature of the water to be treated and the application.

I claim:

1. Apparatus for purifying a fluid which comprises:

a plurality of tubes each containing at least one fluid treating element adapted to receive said fluid to be purified;

first and second end plates integrally joined to the respective ends of said tubes;

first and second fluid distribution means located respectively within said first and second end plates and being in fluid communication with the ends of said tubes;

means in fluid communication with said first fluid distribution means for introducing said fluid into said first end plate, said first fluid distribution means directing said fluid through one end of one of said tubes;

said first and second fluid distribution means being adapted to pass said fluid sequentially through each of said tubes to purify said fluid; and means in fluid communication with said second fluid distribution means for removing purified fluid from said second end plate, whereby said apparatus constitutes a one piece, self contained fluid purification cartridge.

2. The apparatus of claim 1 wherein said fluid distribution means comprises pre-selective fluid passageway means for connecting the flow of fluid through said plurality of tubes in a predetermined manner.

3. The apparatus of claim 1 wherein said self-contained cartridge is formed of plastic and constitutes a disposable device.

4. The apparatus of claim 1 including first and second connectors formed on said first and second end plates to provide the necessary inlet and outlet fluid connections between said self-contained cartridge and an associated control unit.

5. The apparatus of claim 4 wherein said connectors are adapted to provide fast connections and disconnections between said self-contained cartridge and said control unit.

6. The apparatus of any one of claims 1, 2 or 4 including a thin grid with a pore diameter of a few tens of microns being disposed between one of said tubes and one of said end plates, said grid being retained by a rim and a star-shape part formed on said one end plate and serving to retain resin or carbon particles contained in said tubes.

7. The apparatus of any one of claims 1, 2 or 4 including means integral with a filter disposed between said tube and said end plate to guide said filter into the tube, to fix said filter into said cartridge and to provide a seal between said inlet and outlet sides of the filter.

* * * * *